(12) United States Patent
Vilgiate

(10) Patent No.: US 10,785,921 B2
(45) Date of Patent: *Sep. 29, 2020

(54) HORTICULTURE GROW LIGHTS

(71) Applicant: CABATECH, LLC, Encino, CA (US)

(72) Inventor: Anthony Vilgiate, Woodland Park, CO (US)

(73) Assignee: CABATECH, LLC, Encino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,943

(22) Filed: Dec. 21, 2018

(65) Prior Publication Data

US 2020/0229355 A1 Jul. 23, 2020

Related U.S. Application Data

(63) Continuation of application No. 15/785,379, filed on Oct. 16, 2017, now Pat. No. 10,159,198, which is a continuation of application No. 15/280,996, filed on Sep. 29, 2016, now Pat. No. 9,820,447.

(60) Provisional application No. 62/234,480, filed on Sep. 29, 2015.

(51) Int. Cl.
*A01G 7/04* (2006.01)
*H05B 45/20* (2020.01)
*F21W 131/109* (2006.01)
*F21Y 115/10* (2016.01)

(52) U.S. Cl.
CPC ............. *A01G 7/045* (2013.01); *H05B 45/20* (2020.01); *F21W 2131/109* (2013.01); *F21Y 2115/10* (2016.08)

(58) Field of Classification Search
None
See application file for complete search history.

(56) References Cited

U.S. PATENT DOCUMENTS

| 9,820,447 B2 * | 11/2017 | Vilgiate | .............. A01G 7/045 |
| 10,159,198 B2 * | 12/2018 | Vilgiate | .............. A01G 7/045 |
| 2010/0277078 A1 | 11/2010 | Morton | |
| 2012/0001555 A1 | 1/2012 | Tu | |
| 2012/0038280 A1 | 2/2012 | Zoorob | |

(Continued)

FOREIGN PATENT DOCUMENTS

CN 204201522 3/2015
WO WO 2011057431 A1 5/2011

OTHER PUBLICATIONS

Extended European Search Report for corresponding European Patent Application No. 16852627.5, dated Mar. 18, 2019, 7 pages.

(Continued)

*Primary Examiner* — Dedei K Hammond
(74) *Attorney, Agent, or Firm* — Lewis Roca Rothgerber Christie LLP

(57) ABSTRACT

A grow light includes a plurality of cool white LEDs, a plurality of warm white LEDs, and a driver electrically coupled to the cool white LEDs and the warm white LEDs. An intensity level and spectral composition of the radiant energy emitted by the grow light may be tuned or configured by varying a ratio of the quantity of cool white LEDs to the quantity of warm white LEDs, by varying a spatial arrangement among the cool white LEDs and the warm white LEDs, or by varying a level of current provided to some or all of the cool white LEDs and the warm white LEDs.

17 Claims, 9 Drawing Sheets

(56) References Cited

U.S. PATENT DOCUMENTS

| | | |
|---|---|---|
| 2012/0218750 A1 | 8/2012 | Klase |
| 2012/0286699 A1 | 11/2012 | Yan |
| 2012/0326627 A1 | 12/2012 | Mcdaniel, Jr. |
| 2013/0211608 A1 | 8/2013 | Farrell |
| 2013/0293156 A1 | 11/2013 | Wells |
| 2015/0230409 A1* | 8/2015 | Nicole .................. A01G 7/045 47/17 |
| 2018/0054974 A1* | 3/2018 | Vasilenko .............. A01G 7/045 |

OTHER PUBLICATIONS

International Search Report and Written Opinion dated Dec. 28, 2016, issued in PCT/US16/54522 (17 pages).
EP Office action issued in EP Application No. 16852627.5, dated Apr. 8, 2020, 6 pages.

\* cited by examiner

HORTICULTURE GROW LIGHTS

CROSS-REFERENCE TO RELATED APPLICATION(S)

This application is a continuation of U.S. patent application Ser. No. 15/785,379, filed in the United States Patent and Trademark Office on Oct. 16, 2017, which is a continuation of U.S. patent application Ser. No. 15/280,996, filed in the United States Patent and Trademark Office on Sep. 29, 2016, which claims priority to and the benefit of U.S. Provisional Patent Application No. 62/234,480 filed Sep. 29, 2015, the entire contents of which are incorporated herein by reference.

BACKGROUND

Many challenges arise when attempting to grow plants and other photoautotrophs indoors. Among them, the greatest is the task of providing such organisms the radiant energy they need to optimize photosynthesis. Previously existing grow lights, such as high-pressure sodium lamp grow lights, metal halide lamp grow lights, and grow lights featuring blue and red LEDs, have addressed the challenge by employing a shotgun-approach. Namely, they provide a large, fixed volume of light having a fixed spectral composition with the hope that the target crop will receive the type and amount of radiant energy it requires for optimal growth. Such grow lights waste considerable amounts of energy by producing light with spectral compositions that are not optimal for photosynthesis. Moreover, they fail to take advantage of the fact that the effectiveness with which photoautotrophs absorb and respond to different intensities and spectral compositions often varies depending on species, season, growth cycle, and other factors. Additionally, in many cases, previously existing grow lights emit large volumes of light in hues that are unnatural, uncomfortable, and possibly even harmful for horticulturalists tasked with tending to crop under such lights (e.g., visible purple or pink hues produced by simultaneously using blue LEDs and red LEDs).

SUMMARY

In one or more embodiments, a horticulture grow light includes a plurality of cool white LEDs, a plurality of warm white LEDs, and a driver electrically coupled to the cool white LEDs and the warm white LEDs. The horticulture grow light is configured to emit a radiant energy having a spectral composition having a first-highest peak wavelength of from 400 nm to 510 nm or from 560 nm to 780 nm and, with respect to the first-highest peak wavelength, a second-highest peak wavelength of from 400 nm to 510 nm or from 560 nm to 780 nm.

In one or more embodiments, a horticulture grow light includes a plurality of cool white LEDs, a plurality of warm white LEDs, a first driver electrically coupled to the cool white LEDs, and a second driver electrically coupled to the warm white LEDs. The horticulture grow light is configured to emit a radiant energy having a spectral composition having a first-highest peak wavelength of from 400 nm to 510 nm or from 560 nm to 780 nm and, with respect to the first-highest peak wavelength, a second-highest peak wavelength of from 400 nm to 510 nm or from 560 nm to 780 nm.

In one or more embodiments, a horticulture grow light includes a plurality of light engines. Each of the light engines includes a plurality of cool white LEDs and a plurality of warm white LEDs. The grow light includes a driver electrically coupled to at least one of the light engines. The horticulture grow light is configured to emit a radiant energy having a spectral composition having a first-highest peak wavelength of from 400 nm to 510 nm or from 560 nm to 780 nm and, with respect to the first-highest peak wavelength, a second-highest peak wavelength of from 400 nm to 510 nm or from 560 nm to 780 nm.

DETAILED DESCRIPTION

Figure 1:
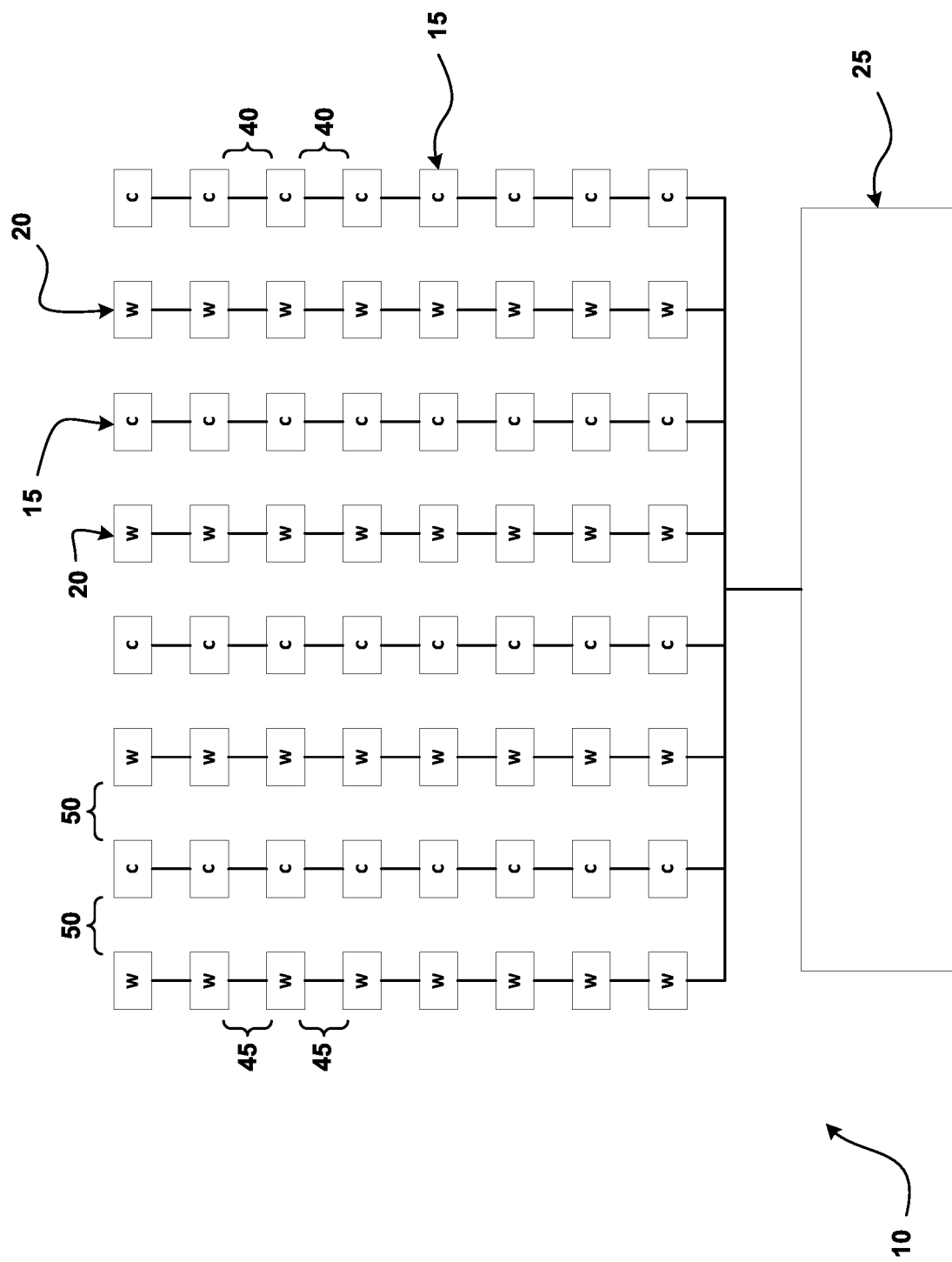
FIG. 1 is a block diagram of an exemplary grow light in accordance with one or more embodiments.

As described and illustrated by way of one or more exemplary embodiments, novel horticulture grow lights are provided (e.g., white LED grow lights). As those of ordinary skill in the art will recognize and appreciate, the one or more embodiments described and/or illustrated in this application are provided for explanatory purposes only and are neither exhaustive nor otherwise limited to the precise forms described and/or illustrated. On the contrary, as those of ordinary skill in the art will readily recognize and appreciate in view of the teachings in this application, additional embodiments and variations are possible in light of, and contemplated by, such teachings. For purposes of this application, the term "exemplary" means one of many possible non-limiting examples provided for explanatory purposes. As used in this application, the term "exemplary" does not mean preferable, optimal, or ideal, and does not mean that the presence of any elements, components, or steps present in any subject matter referenced as "exemplary" are necessary or required in other possible embodiments or variations of the referenced subject matter. For purposes of this application, the articles "a" and "an" mean one or more unless otherwise stated (e.g., when followed by the term "plurality"). For purposes of this application, the terms "comprises," "comprising," "includes," and "including" all mean including but not limited to the items, elements, components, or steps listed.

As those of ordinary skill in the art will appreciate, a light-emitting diode (LED) is a two-lead semiconductor light source. When a forward current flows through a semiconductor diode junction, electrons and holes in the semiconductor material recombine to release energy in the form of photons. The use of semiconductor materials that release photons having wavelengths that are perceived by the human eye as blue (e.g., gallium-nitride) may be combined with one or more phosphors layered on the inside of an LED lens (e.g., a single phosphor or a phosphor blend). In such cases, the human eye perceives the blue photons only after having passed through the phosphor, the effect of which casts a light that the human eye perceives as white.

Not all white light produced by LEDs is identical. Depending on the semiconductor materials and the types and amounts of phosphors used, white light may correspond to one of many different color temperatures expressed in kelvins (K). For purposes of this application, the term "color temperature" means the temperature of an ideal black-body radiator that radiates light of comparable hue to that of the light source being referenced. The color temperatures comprise a spectrum that includes cool white light, neutral white light, and warm white light. For purposes of this application, the term "warm" means having a color temperature that is less than or equal to 3500 K, while the term "cool" means having a color temperature that is equal to or greater than 5000 K. For purposes of this application, the term "neutral" means having a color temperature that is between 3501 K and 4999 K.

In one or more embodiments, a grow light includes a plurality of cool white LEDs and a plurality of warm white LEDs. The grow light may include a driver electrically coupled to the cool white LEDs and the warm white LEDs. Alternatively, the plurality of cool white LEDs and the plurality of warm white LEDs may be electrically connected to separate drivers. In one or more embodiments, a desired intensity level and/or spectral composition of the radiant energy emitted by the grow light may be tuned or configured. The intensity and/or spectral composition may be tuned or configured by varying a ratio of the quantity of cool white LEDs to the quantity of warm white LEDs, by varying a spatial arrangement among the cool white LEDs and the warm white LEDs, and/or by varying a level of current provided to some or all of the cool white LEDs and/or warm white LEDs.

The grow lights described in this application provide numerous technological advancements and benefits over previously existing horticulture grow lights. In one or more embodiments, such advancements and benefits include the ability to achieve significantly increased yields by tuning or configuring the intensity level and/or spectral composition of the radiant energy emitted by the grow light. The ability to tune or configure the intensity level and/or spectral composition gives horticulturalists the ability to provide a target crop with radiant energy having spectral peaks that are commensurate with the crop's actual photosynthetic needs during a particular season or grow cycle (e.g., photosynthetically active radiation, ultraviolet radiation, and/or infrared radiation). In addition to enabling increased crop yields, the ability to focus radiant energy in select spectrums that a target crop can actually absorb and use during photosynthesis (e.g., through the formation of predetermined spectral peaks within the spectral composition) results in grow lights that are far more energy efficient than previously existing grow lights (e.g., reducing relative energy consumption by up to 50% in one or more embodiments). Given these advancements, those of ordinary skill in the art may appreciate that a horticulturalist's use of one or more embodiments of the grow lights described in this application is, in contrast to the shotgun approach employed by previously existing horticultural grow lights, akin to a performing surgery with a scalpel rather than a machete.

Moreover, in one or more embodiments the grow lights described in this application include wireless (e.g., cloud-based) and/or autonomous control modules that include or are compatible with native and/or remote control software. As a result, in one or more embodiments the grow lights may be programmed to retune, reconfigure, or otherwise dynamically change the intensity and/or spectral composition of the radiant energy provided to a target plant or other photoautotroph. The retuning or reconfiguration may occur automatically in response to a predetermined trigger or event, or it may occur in real-time as requested by a user (e.g., "on-demand" or "on-the-fly"). The ability to repeatedly retune, reconfigure, or otherwise dynamically change the intensity and/or spectral composition of the radiant energy the lights emit permits horticulturalists to employ a "cradle-to-crave" approach in which a crop may remain in the same location under the same light throughout all stages of its growth cycle (e.g., beginning with seed germination or with a seedling, cutting, or clone and proceeding through the vegetative, budding, flowering, and ripening stages).

Additionally, in one or more embodiments the dominant visible light (or the only perceptible visible light) emitted by the grow lights described in this application is white light (e.g., through the use of predominantly or only white LEDs). As a result, the grow lights emit a radiant energy that the human body may perceive as significantly more natural than the pink or purple hues emitted by previously existing horticultural grow lights. Thus, horticulturalists who tend to crops under one or more embodiments of the grow lights described in this application may experience less discomfort and health risks and be able to do so without wearing special eye protection.

The many technological advancements and benefits provided by one or more embodiments of the grow lights described in this application may be employed in any number of horticultural and/or agricultural applications, including the production of plants, algae, cyanobacteria, other photoautotrophs, and other applications that those of ordinary skill in the art will recognize and appreciate in view of the teachings in this application.

FIG. 1 is a block diagram of an exemplary grow light in accordance with one or more embodiments. In one or more embodiments, a grow light 10 includes a plurality of cool white LEDs 15, a plurality of warm white LEDs 20, and a driver 25 electrically coupled to cool white LEDs 15 and warm white LEDs 20. In one or more embodiments, cool white LEDs 15 may have a color temperature ranging from 5000 K to 8000K. In one or more embodiments, for example, cool white LEDs 15 may be Samsung LM561B 5000 K or "50K" LEDs. In one or more embodiments, for example, warm white LEDs 20 may have a color temperature ranging from 2000 K to 3000 K. In one or more embodiments, warm white LEDs 20 may be Samsung LM561B K or "30K" LEDs. Those of ordinary skill in the art will appreciate that, although white LEDs having certain color temperatures are described in this application for exemplary purposes, combinations of white LEDs having other temperatures (e.g., ranging from 2200 K to 12000 K) are made possible in view of, and contemplated by, these teachings. Moreover, although one or more embodiments are provided in the context of LEDs, one or more embodiments of grow light 10 may include other types of diode-based light sources (e.g., organic light-emitting diode (OLED) lights).

Although FIG. 1 illustrates a single driver 25, in one or more embodiments grow light 10 may include a plurality of drivers. Grow light 10 may, for instance, include a first driver electrically coupled to cool white LEDs 15 and a second driver electrically coupled to warm white LEDs 20. Cool white LEDs 15 may be electrically coupled to one another and/or to driver 25 within a first circuit, while warm white LEDs 20 may be electrically coupled to one another and/or to driver 25 within a second circuit. In one or more embodiments, cool white LEDs 15 and warm white LEDs 20 may be electrically coupled to one another and/or to driver 25 within a single combined circuit.

As those of ordinary skill in the art will appreciate, driver 25 has a power rating commensurate with the quantity of, and level of current provided to, each of cool white LEDs 15 and warm white LEDs 15. Driver 25 may, for example, have a 400 W power rating, a 120 W power rating, a 25 W power rating, or another power rating recognized as suitable by those of ordinary skill in the art. Driver 25 may be manually switched through a fixture-mounted rocker, or driver 25 may be automatically switched by a wireless controller and timer. Tuning or configuring the light intensity and/or spectral composition of the radiant energy emitted by grow light 10 may include tuning or configuring driver 25 to provide a predetermined level of current to some or all of cool white LEDs 15 and/or warm white LEDs 20 (e.g., 80 to 90 milliamps, as discussed later in further detail).

Although the block diagram of FIG. 1 depicts certain components and connections for illustrative purposes, those of ordinary skill in the art should readily understand and appreciate that other possible components and connections are possible in light of, and contemplated by, the teachings in this application. Similarly, although the block diagram of FIG. 1 depicts a single grow light 10, those of ordinary skill in the art should, in view of these teachings, understand and appreciate that a plurality of grow lights 10 may be employed in an electrically coupled, communicatively coupled (e.g., networked through a wireless communications network), or otherwise coupled fashion in which grow lights 10 communicate directly with one another or through a central computerized control system.

In one or more embodiments, a desired intensity level and/or spectral composition of the radiant energy emitted by grow light 10 may be tuned or configured by varying a ratio of the quantity of cool white LEDs 15 to the quantity of warm white LEDs 20, by varying a spatial arrangement among cool white LEDs 15 and warm white LEDs 20, and/or by varying a level of current provided to some or all of cool white LEDs 15 and/or warm white LEDs 20. In one or more embodiments, the spectral composition of the radiant energy emitted by grow light 10 may be fixed once initially tuned or configured (e.g., as might be performed by a manufacturer). In one or more embodiments, the intensity and/or spectral composition may be retunable or reconfigurable in real-time either manually (e.g., "on-demand" or "on-the-fly" as requested by a user) or automatically in response to a predetermined trigger or event established by the user (e.g., a manufacturer or an end-user).

In one or more embodiments, a sum of the quantity of cool white LEDs 15 and the quantity of warm white LEDs 20 may range from 64 to 2880 LEDs. As illustrated in FIGS. 1, 2, 3, 4, and 5, for example, the sum of the quantity of cool white LEDs 15 and the quantity of warm white LEDs 20 is 64, 64, 420, 1680, and 2100, respectively. Although this application describes a variety of LED quantities within the context of one or more exemplary embodiments, those of ordinary skill in the art should recognize and appreciate that, in view of the teachings in this application, any number of other LED quantities are possible in light of, and contemplated by, such teachings. The quantity of LEDs employed in any given application may depend on crop size, facilities size, available energy and other resources, and other considerations.

In one or more embodiments, for example as illustrated in FIG. 1, the quantity of cool white LEDs 15 may be equal to the quantity of warm white LEDs 20. Thus, a ratio of the quantity of cool white LEDs 15 to the quantity of warm white LEDs 20 may be 1:1. In one or more embodiments, the quantity of cool white LEDs 15 may be greater than the quantity of warm white LEDs 20. For instance, a ratio of the quantity of cool white LEDs 15 to the quantity of warm white LEDs may be from 1.1:1 to 5:1, such as 2:1, 3:1, 4:1, or 5:1. In one or more embodiments, the quantity of cool white LEDs 15 may be greater than the quantity of warm white LEDs 20.

The block diagram of FIG. 1 illustrates an exemplary LED arrangement of grow light 10 in accordance with one or more embodiments. In one or more embodiments, for example as illustrated in FIG. 1, cool white LEDs 15 are arranged or configured in one or more strips (e.g., rows or columns). The plurality of cool white LEDs 15 within each strip may be electrically coupled in series and, in one or more embodiments in which a plurality of strips are used, the plurality of strips may be electrically coupled to driver 25 in parallel. As those of ordinary skill in the art will appreciate, there are many other possible ways in which cool white LEDs 15 may be electrically coupled to each other and/or to driver 25 (e.g., through wiring or printed circuit board traces); the electrical coupling configuration illustrated in FIG. 1 is but one example. In one or more embodiments, a spacing 40 among cool white LEDs 15 within each strip is uniform. In one or more embodiments, spacing 40 may be non-uniform.

In one or more embodiments, for example as illustrated in FIG. 1, warm white LEDs 20 are arranged or configured in one or more strips (e.g., rows or columns). The plurality of warm white LEDs 20 within each strip may be electrically coupled in series and, in one or more embodiments in which a plurality of strips are used, the plurality of strips may be electrically coupled to driver 25 in parallel. As those of ordinary skill in the art will appreciate, there are many other possible ways in which warm white LEDs 20 may be electrically coupled to each other and/or to driver 25 (e.g., through wiring or printed circuit board traces); the electrical coupling configuration illustrated in FIG. 1 is but one example. In one or more embodiments, a spacing 45 among warm white LEDs 20 within each strip is uniform. In one or more embodiments, spacing 45 may be non-uniform.

In one or more embodiments, as illustrated in FIG. 1 for example, cool white LEDs 15 and warm white LEDs 20 are arranged or configured in a plurality of alternating strips (e.g., rows or columns) so as to form an array. In one or more embodiments, a spacing 50 among the alternating strips of cool white LEDs 15 and warm white LEDs 20 is uniform. In one or more embodiments, spacing 50 may be non-uniform. In one or more embodiments, for example as illustrated in FIG. 1, the plurality of strips alternate with a 1:1 frequency (i.e., one strip of cool white LEDs 15, one strip of warm white LEDs 20, one strip of cool white LEDs 15, one strip of warm white LEDs 20, and so forth). In one or more embodiments, the strips may alternate at other suitable frequencies (e.g., one strip of warm white LEDs 20, a plurality of strips of cool white LEDs 15, one strip of warm white LEDs 20, a plurality of cool white LEDs 20, and so forth).

Figure 2:
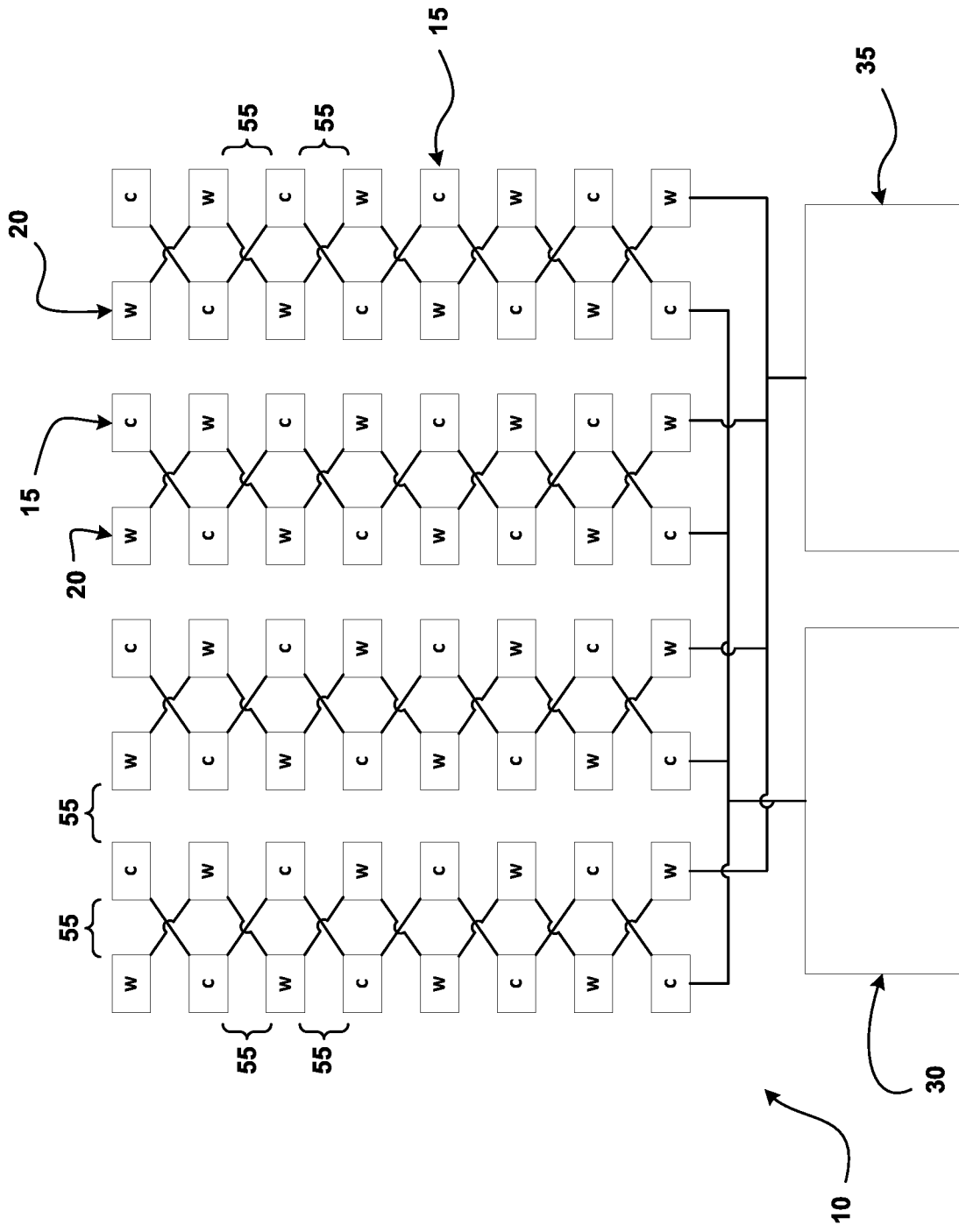
FIG. 2 is a block diagram of an exemplary grow light in accordance with one or more embodiments.

FIG. 2 is a block diagram of an exemplary grow light in accordance with one or more embodiments. FIG. 2 illustrates, in accordance with one or more embodiments, another exemplary LED arrangement of a grow light 10. In one or more embodiments, at least a portion of cool white LEDs 15 and at least a portion of warm white LEDs 20 are, as illustrated in FIG. 2, arranged or configured such that each cool white LED 15 is adjacent to or neighbors at least two warm white LEDs 20. In other words, cool white LEDs 15 and warm white LEDs 20 may be spatially intermixed or arranged or configured in an alternating pattern with respect to one another (e.g., in a row direction and/or in a column direction). In one or more embodiments, as illustrated in FIG. 2 for example, a spacing 55 between each cool white LED 15 and each adjacent or neighboring warm white LED 20 is uniform throughout the array of cool white LEDs 15 and warm white LEDs 20. In one or more embodiments, spacing 55 may be non-uniform. As those of ordinary skill in the art will appreciate, there are many other possible ways in which each of cool white LEDs 15 and warm white LEDs 20 may be electrically coupled to each other and/or to drivers 30 and 35 (e.g., through wiring or printed circuit board traces); the electrical coupling configuration illustrated in FIG. 2 is but one example.

Figure 3:
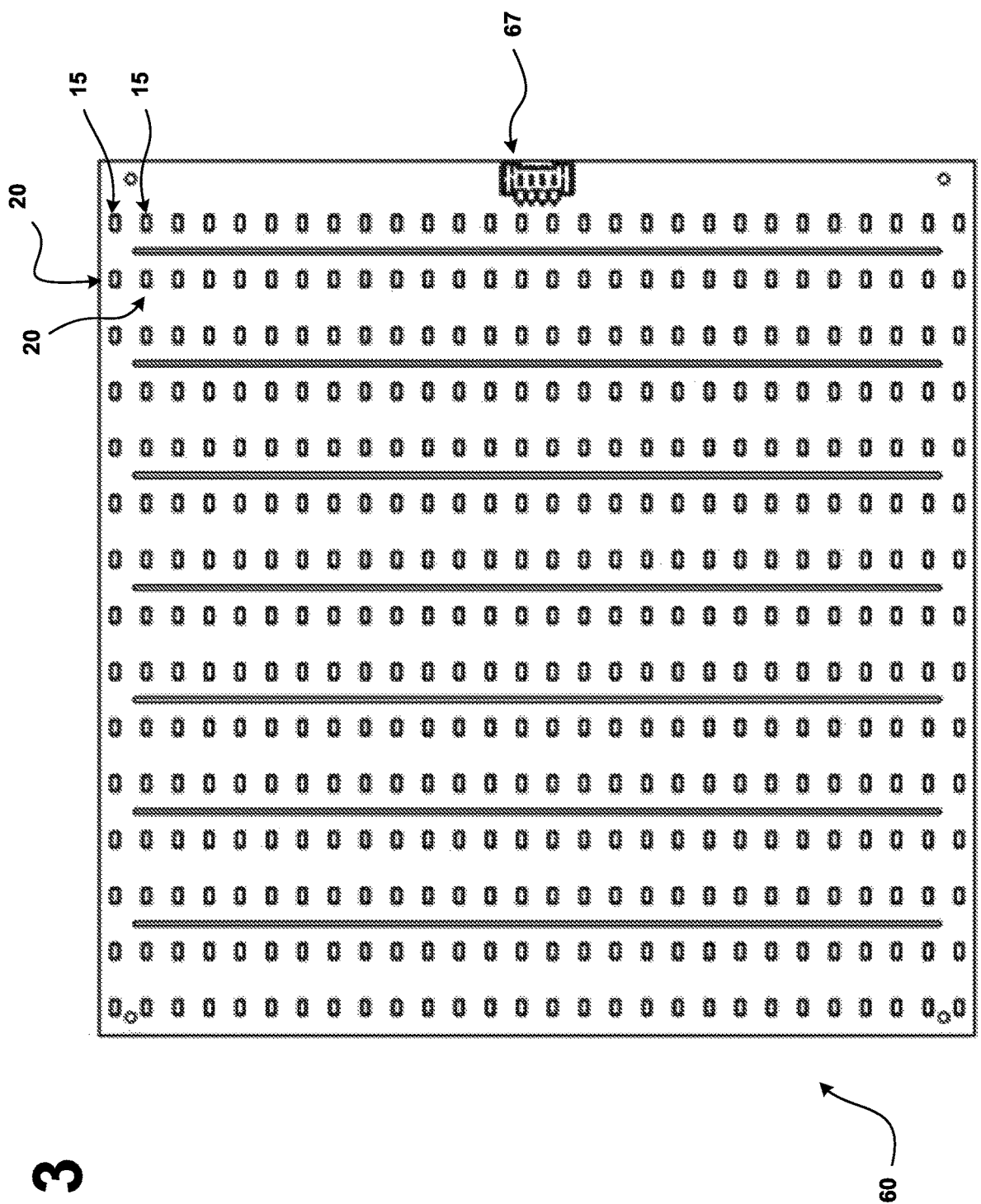
FIG. 3 is a plan view of a light engine of an exemplary grow light in accordance with one or more embodiments.

FIG. 3 is a plan view of a light engine 60 of an exemplary grow light in accordance with one or more embodiments. For purposes of this application, the term "light engine" means at least a plurality of LED chips electrically coupled to a circuit board. As illustrated in FIG. 3, in one or more embodiments grow light 10 includes at least one light engine 60. Light engine 60 includes cool white LEDs 15, warm white LEDs 20, and a circuit board 65 (e.g., a printed circuit board) to which cool white LEDs 15 and warm white LEDs 20 are mounted or otherwise electrically coupled. Light engine 60 includes a power connector 67 through which cool white LEDs 15 and/or warm white LEDs 20 may be electrically coupled to driver 25 as shown in FIG. 1 or to a plurality of drivers, such as drivers 30 and 35 as shown in FIG. 2.

Figure 4:
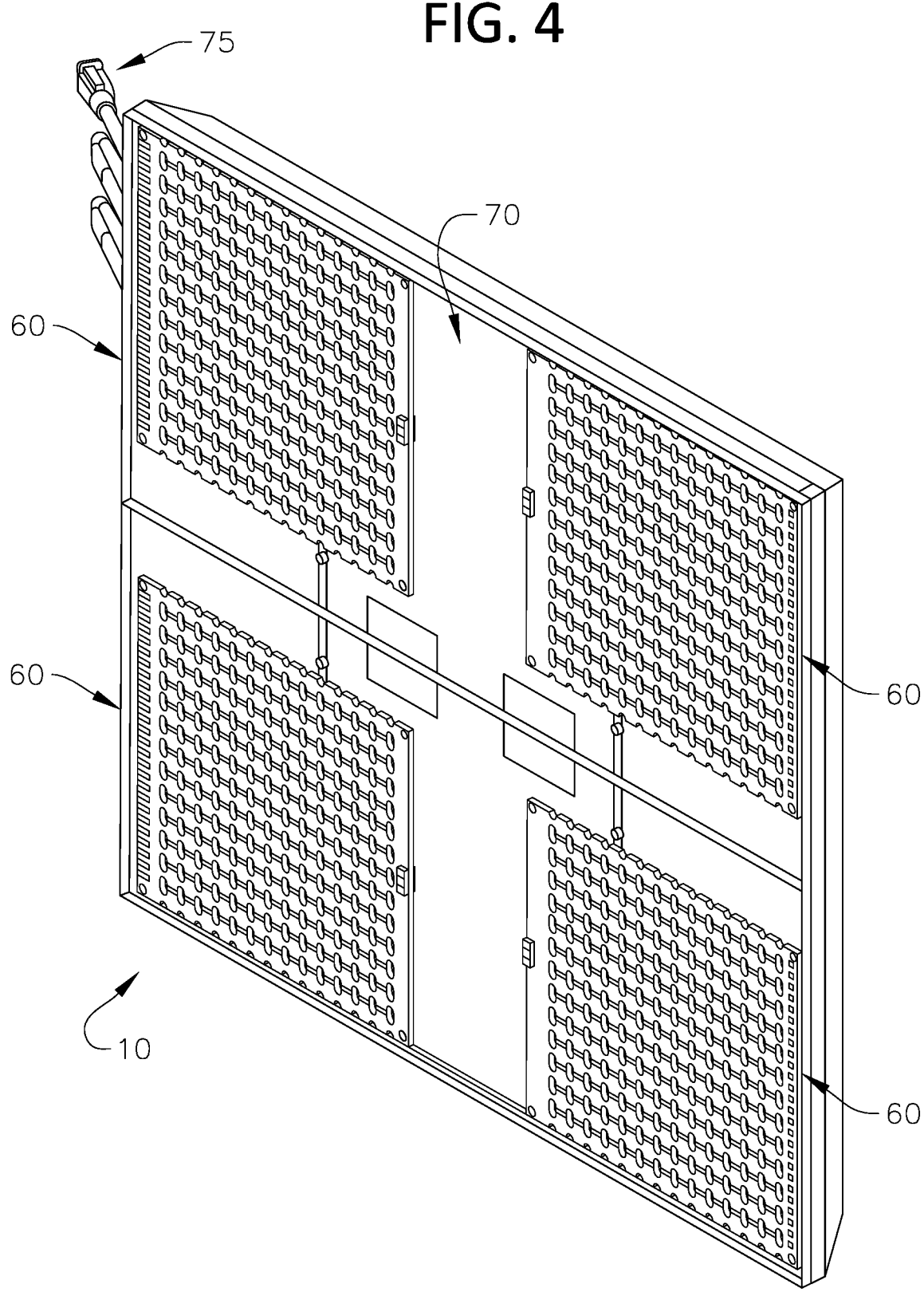
FIG. 4 is a perspective elevation view of an exemplary grow light in accordance with one or more embodiments.

FIG. 4 is a perspective elevation view of an exemplary grow light in accordance with one or more embodiments. As illustrated in FIG. 4, in one or more embodiments grow light 10 includes a plurality of light engines 60. Light engines 60 may each be independently tuned or configured to emit radiant energy having a different intensity and/or spectral composition with respect to one another (e.g., where different plants or plants of different growth cycles may be positioned under each light engine 60, or where the different light intensities and/or different spectral compositions of the radiant energies emitted by each light engines 60 are summed, integrated, or otherwise combined to collectively achieve a desired overall intensity and/or spectral composition emitted by grow light 10). Alternatively, some or all of light engines 60 may be tuned or configured to emit radiant energy having the same intensity and/or spectral composition with respect to one another. Each of light engines 60 may be of any physical dimensions and may include any overall quantity of cool white LEDs 15 and warm white LEDs 20. Those of ordinary skill in the art should, in view of these teachings, appreciate that the light engines depicted in FIG. 4 and elsewhere in this application (e.g., FIGS. 5 and 6) are exemplary and that other possible configurations, including light engines having a variety of geometric layouts, are contemplated by such teachings.

Figure 5:
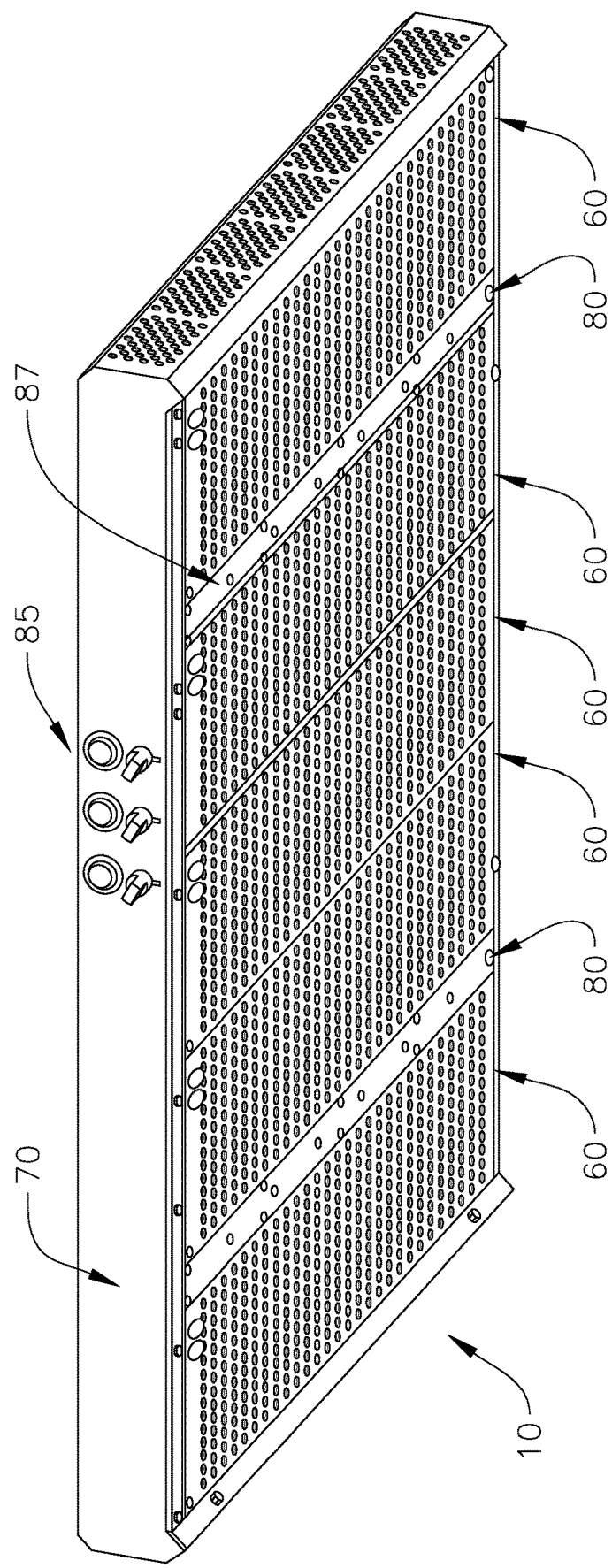
FIG. 5 is a perspective elevation view of an exemplary grow light in accordance with one or more embodiments.

As illustrated in FIG. 4, grow light 10 includes a housing 70. Housing 70 houses a plurality of electrical components, including one or more drivers that provide current to light engines 60 (e.g., driver 25 as shown in FIG. 1 or drivers 30 and 35 as shown in FIG. 2). Housing 70 may further include other components, examples of which are illustrated in FIG. 5. Housing 70 further includes a power cord through which grow light 10 may receive electrical power (e.g., 110-120 VAC/60 Hz as commonly provided by wall outlets in the United States). Housing 70 may be formed of aluminum (e.g., unpainted aluminum) or other materials recognize as suitable by those of ordinary skill in the art.

FIG. 5 is a perspective elevation view of an exemplary grow light in accordance with one or more embodiments. As illustrated in FIG. 5, grow light 10 may also include one or more supplemental radiation engines 80 in addition to housing 70 and light engines 60 shown in FIG. 4. Housing 70 may include one or more user control interfaces 85. User control interfaces 85 may include, for example, one or more power switches by which a user may power on or off one or more circuits of grow light 10 (e.g., a first power switch that may power on and off a first circuit that includes cool white LEDs 15 of each light engine 60, a second power switch that may power on and off a second circuit that includes warm white LEDs 20 of each light engine 60, and a third power switch that may power on and off a third circuit that includes a plurality of supplemental radiation emitters 87 of radiation engines 80). User control interfaces 85 may further include one or more knobs, dials, buttons, sliders, pressure sensors, touch screens, or other control interfaces by which a user may retune or reconfigure the intensity and/or spectral composition of the radiant energy emitted by grow light 10 in real-time (e.g., "on-demand" or "on-the-fly"). In one or more embodiments, user control interfaces 85 may include a potentiometer (e.g., a 50 KΩ potentiometer) electrically coupled to each circuit of grow light 10 (e.g., a first circuit that includes cool white LEDs 15 of each light engine 60, a second circuit that includes warm white LEDs 20 of each light engine 60, and a third circuit that includes supplemental radiation emitters 87 of supplemental radiation engines 80). The potentiometer may, for example, be electrically coupled in series with each driver of grow light 10.

Figure 7:
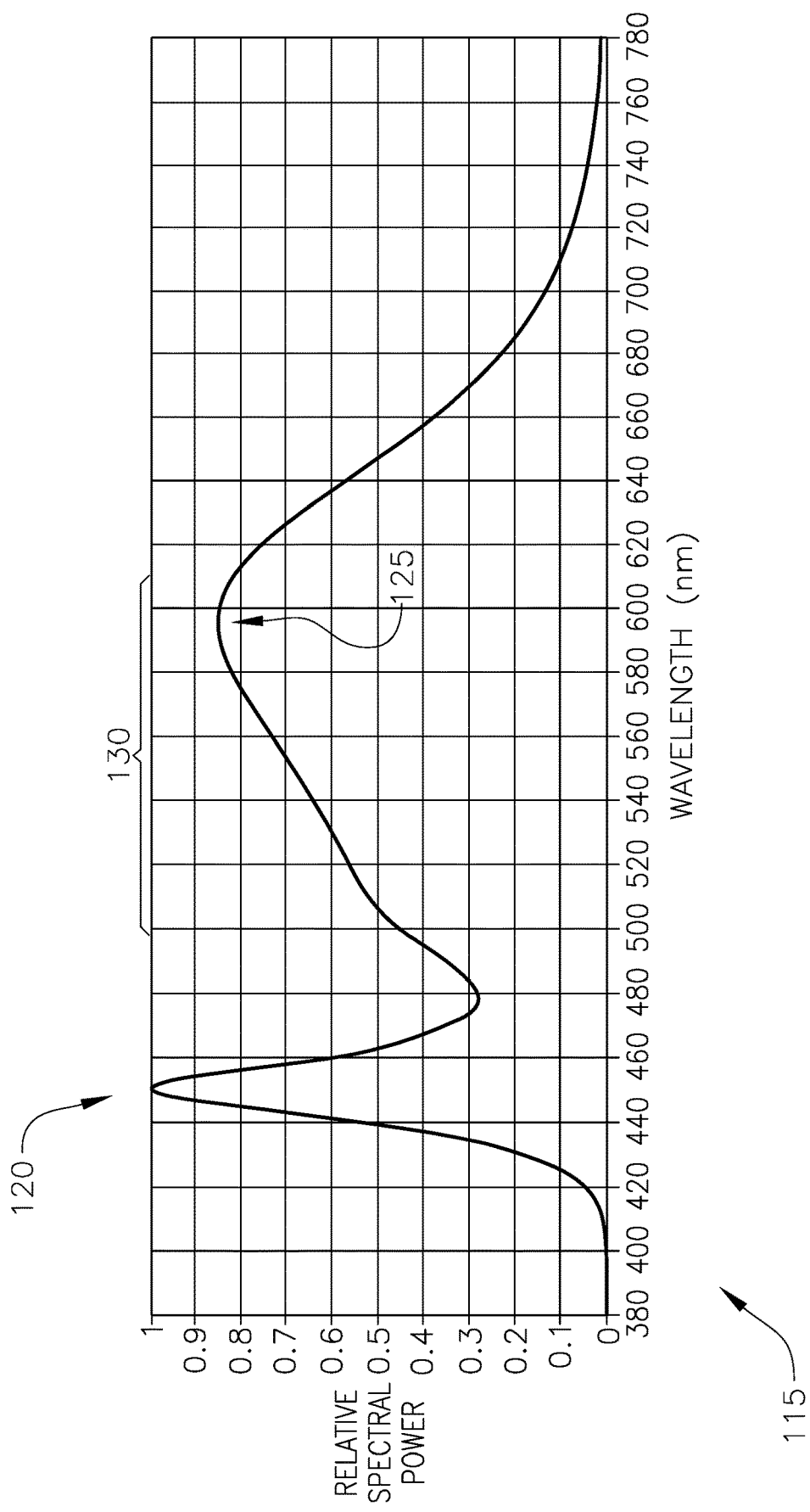
FIG. 7 is a graph illustrating a tuned or configured spectral composition of an exemplary grow light having a plurality of cool white LEDs and a plurality of warm white LEDs in accordance with one or more embodiments.
Figure 8:
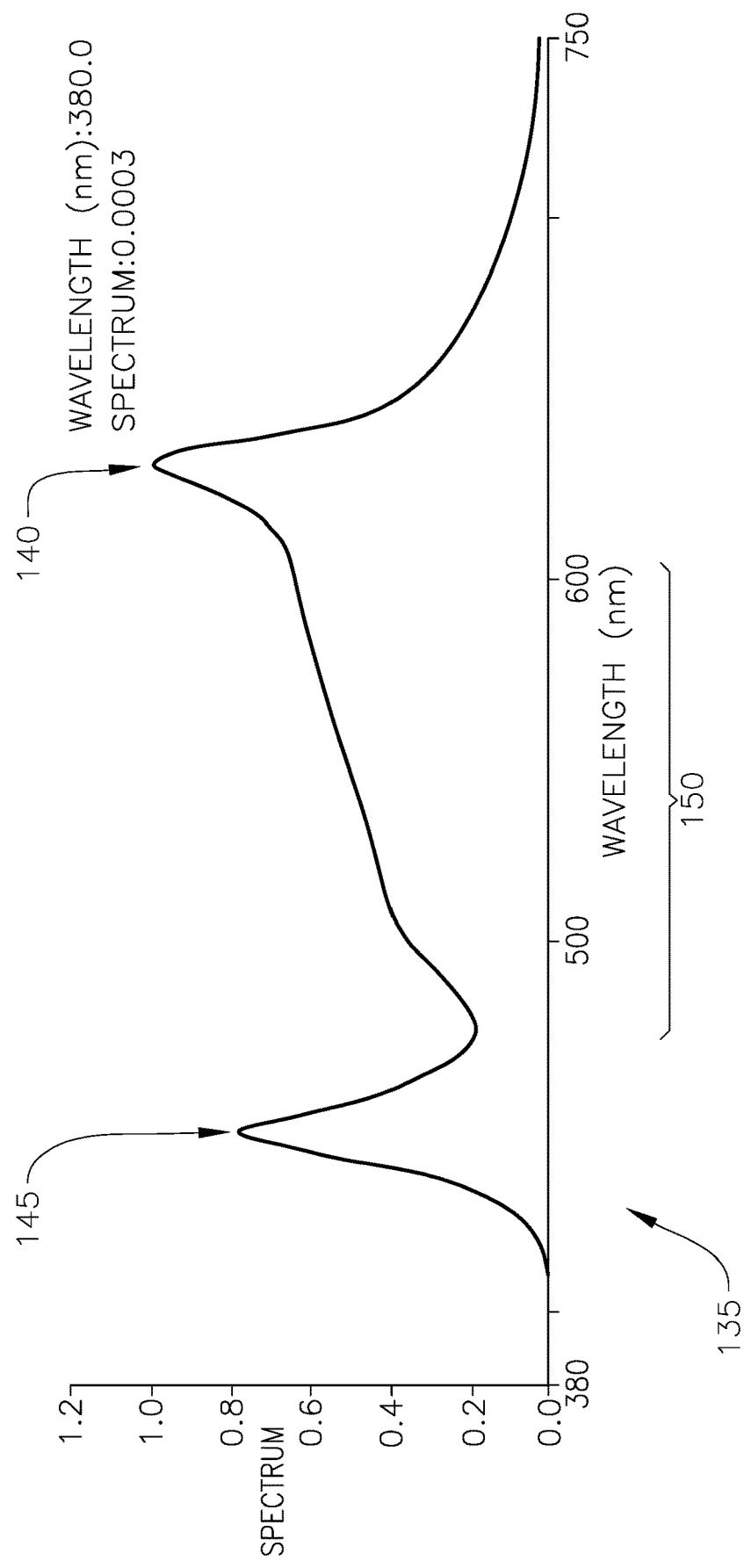
FIG. 8 is a graph illustrating a tuned or configured spectral composition of an exemplary grow light having one or more light engines and one or more supplemental radiation engines in accordance with one or more embodiments.
Figure 9:
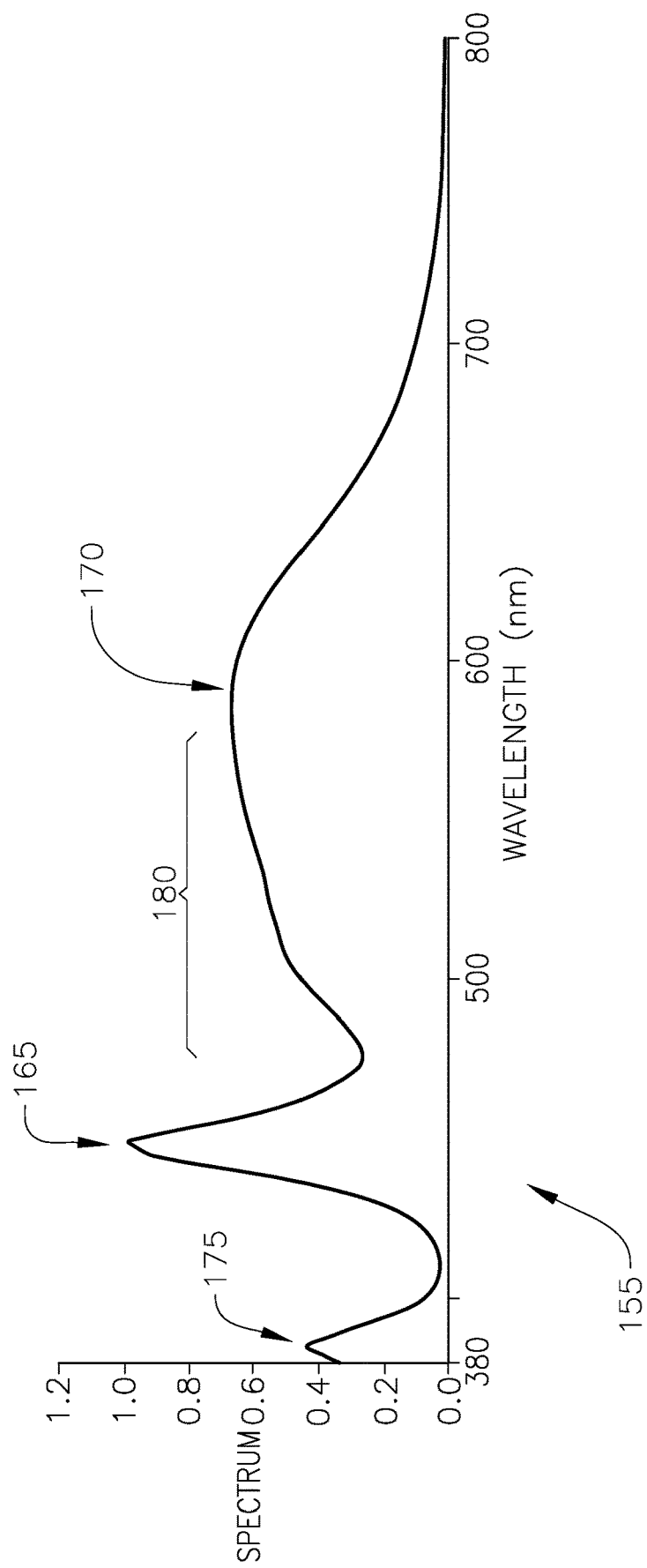
FIG. 9 is a graph illustrating another tuned or configured spectral composition of an exemplary grow light having one or more light engines and one or more supplemental radiation engines in accordance with one or more embodiments.

In one or more embodiments, grow light 10 may include an integrated PAR meter or spectrometer that measures an intensity and/or spectral composition of the radiant energy emitted by grow light 10 in real-time and display a spectral graph to the user (e.g., the spectral graph illustrated in FIGS. 7-9). As a result, the user may retune or reconfigure the intensity and/or spectral composition in real-time as desired based on the data provided in the spectral graph (e.g., by adjusting the current levels provided by the drivers).

Each of supplemental radiation engines 80 may be of any physical dimensions and may include any overall quantity of supplemental radiation emitters 87. Those of ordinary skill in the art should, in view of these teachings, appreciate that the supplemental radiation engines depicted in FIGS. 5 and 6 are exemplary and that other possible configurations, including light engines having a variety of geometric layouts, are contemplated by such teachings.

Figure 6:
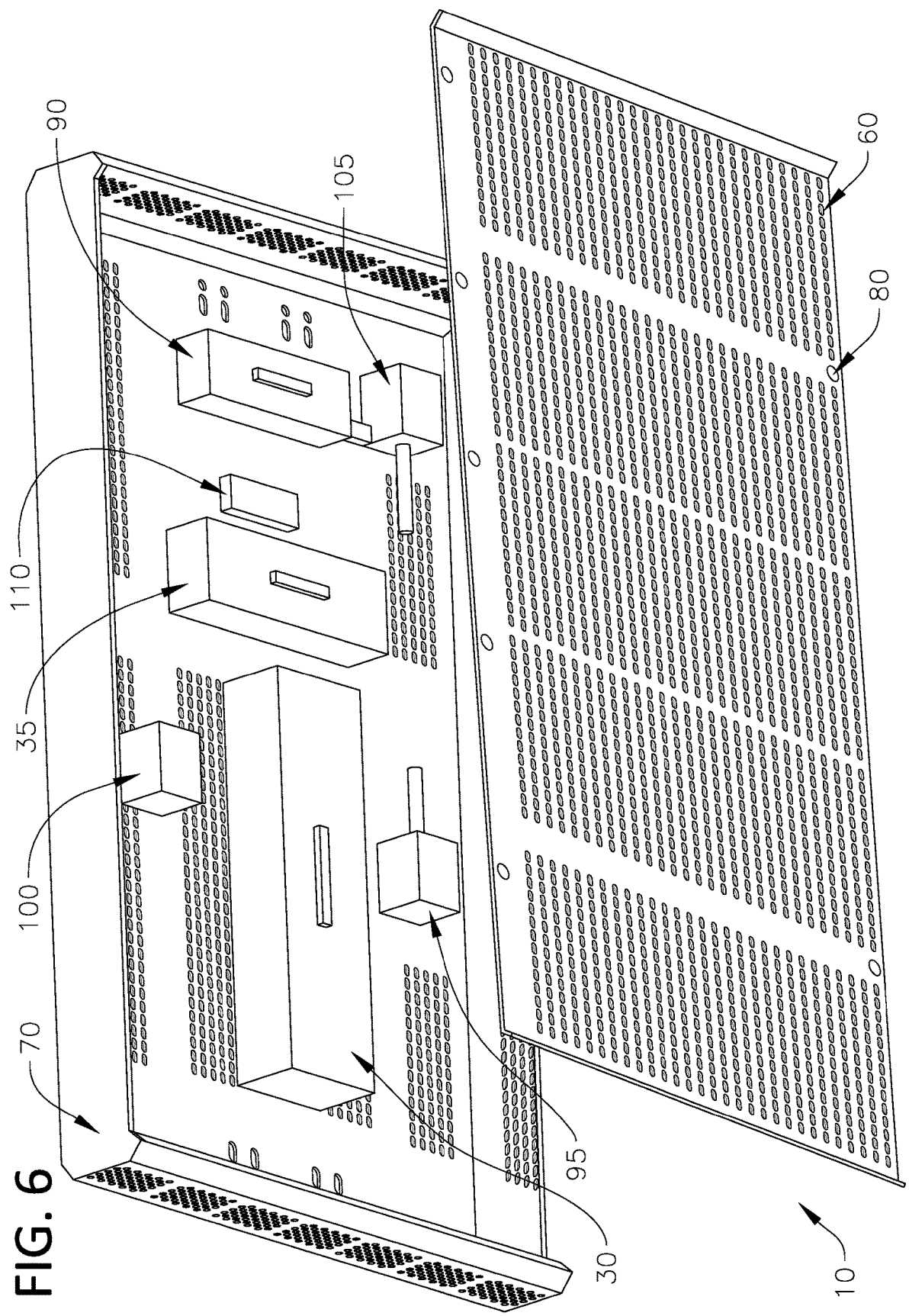
FIG. 6 is a perspective elevation view of an interior of a housing of the exemplary grow light shown in FIG. 5.

FIG. 6 is a perspective elevation view of an interior of housing the exemplary grow light shown in FIG. 5 in accordance with one or more embodiments. As illustrated in FIG. 6, housing 70 of grow light 10 houses first and second drivers 30 and 35 (as likewise illustrated in block-diagram form in FIG. 2) and a third driver 90. First driver 30 is electrically coupled to each light engine 60 and provides current to cool white LEDs 15 of each light engine 60 (as illustrated for example in FIG. 2). Second driver 35 is electrically coupled to each light engine 60 and provides current to warm white LEDs 20 of each light engine 60 (also illustrated in FIG. 2). Third driver 90 is electrically coupled to each supplemental radiation engine 80 and provides current to one or more supplemental radiation emitters 87 of each supplemental radiation engine 80 (e.g., ultraviolet radiation emitters, infrared radiation emitters, or supplemental white light emitters tuned or configured so as to emit supplemental radiant energies having an intensity and/or spectral composition that compliments or supplements the radiant energies emitted by light engines 60). In one or more embodiments, each supplemental radiation engine 80 may produce 5000 milliwatts of ultraviolet radiation.

Grow light 10 further includes (e.g., within housing 70 as depicted in FIG. 6), one or more control modules (e.g., control modules 95, 100, and 105). Control modules 95, 100, and 105 may each be an autonomous control module (and may include a graphical user interface, such as a digital graphical user interface, or other user control interface), a wireless control module, or another control module recognized as suitable by those of ordinary skill in the art. Control module 95 is electrically coupled to driver 30 and permits the user to control the current supplied by driver 30 to cool white LEDs 15 of each light engine 60. Control module 100 is electrically coupled to driver 35 and permits the user to control the current supplied by driver 35 to warm white LEDs 20 of each light engine 60. Control module 105 is electrically coupled to driver 90 and permits the user to control the current supplied by driver 90 to each supplemental radiation emitter 87 of each supplemental radiation engine 80. By varying the current supplied to cool white LEDs 15 and/or warm white LEDs 20 of each light engine 60, the user may tune or configure the intensity and/or spectral composition of the radiant energy emitted by each light engine 60. By varying the current supplied to supplemental radiation emitters 87 of each supplemental radiation engine 80, the user may further tune or configure the manner in which supplemental radiation engines 80 compliment or supplement light engines 60 to achieve a desired overall intensity and/or overall spectral composition of the collective radiant energy emitted by grow light 10. Although FIG. 6 illustrates grow light 10 as including three drivers (i.e., driver 30, driver 35, and driver 90), in one or more embodiments grow light 10 may alternatively include only a single driver (e.g., driver 25 as illustrated in FIG. 1, which may be a multi-channel driver to reduce cost, lower weight specifications, and streamline the assembly process) or more or less than three drivers depending on the quantity, power, and control requirements of light engines 60 and/or supplemental radiation engines 80.

In one or more embodiments in which control modules 95, 100, and/or 105 are wireless control modules, control modules 95, 100, and/or 105 may communicate with one more remote computing devices (e.g., one or more web servers, application servers, and/or cloud servers, any or all of which may in turn communicate with each other and/or a mobile application or other software application presenting a graphical user interface through which a user may send tuning, configuration, and/or other control signals to control modules 95, 100, and/or 105.

Although FIG. 6 depicts a single grow light 10, those of ordinary skill in the art should, in view of the teachings in this application, understand and appreciate that a plurality of such grow lights 10 may be employed in an electrically coupled, communicatively coupled (e.g., networked through a wireless communications network), or otherwise coupled fashion in which grow lights 10 communicate directly with one another or through a central computerized control system. The plurality of networked grow lights 10 (e.g., one or more banks of networked grow lights 10) may be controlled through a distributed or enterprise-level wireless control system or, in scenarios in which access to the Internet or other wide area network is limited or unavailable, through a local area network (e.g., featuring a master/slave control configuration). In one or more embodiments, networked grow lights 10 may each include user control interfaces 85 as a manual backup to such distributed or enterprise-level wireless control system. In one or more embodiments in which control modules 95, 100, and/or 105 are wireless control modules, control modules 95, 100, and/or 105 may be configured or programmed to automatically retune or reconfigure the intensity and/or spectral composition of the radiant energy emitted from one or more light engines 60 and/or supplemental radiation engines 80 based on calendar scheduling, circadian cycles, sunrise/sunset times, and/or other considerations dictated by plant species, growth cycle, season, and other factors affecting plant growth.

Although in one or more embodiments driver 30, driver 35, driver 90, control module 95, control module 100, and control module 105 may be housed within housing 70 of grow light 10, driver 30, driver 35, driver 90, control module 95, control module 100, and/or control module 105 may alternatively be disposed outside of housing 70 and/or in a location remote from housing 70 (e.g., in a separate housing, in a separate region of a room, or in a separate room or building) while still remaining electrically and/or communicatively coupled to light engines 60, supplemental radiation engines 80, and other components of grow light 10. Those of ordinary skill in the art should, in view of these teachings, recognize and appreciate that there are many possible ways in which the various components of grow light 10 may be spatially disposed and electrically and/or communicatively coupled so as to function together as grow light 10 (e.g., as a distributed system). Although FIG. 6 illustrates grow light 10 as including three control modules (i.e., control modules 95, 100, and 105), in one or more embodiments grow light 10 may alternatively include more or less than three control modules, such as a single control module (e.g., a multi-channel control module) that governs all drivers depending on the quantity, power, and control requirements of light engines 60 and/or supplemental radiation engines 80.

As illustrated in FIG. 6, housing 70 of grow light 10 includes a power entry module 110 configured to distribute power from an external power source (e.g., a 110-120 VAC/60 Hz power supply as commonly provided by standard wall outlets in the United States) to the various electrical components of grow light 10. Although FIG. 6 depicts certain components and connections for illustrative purposes, those of ordinary skill in the art should readily understand and appreciate that other possible components and connections are possible in light of, and contemplated by, these teachings.

FIG. 7 is a graph 115 illustrating a tuned or configured spectral composition of an exemplary grow light having a plurality of cool white LEDs 15 and a plurality of warm white LEDs 20 as illustrated, for example, in FIGS. 1-4. As discussed above, in one or more embodiments a desired intensity level and spectral composition of the radiant energy emitted by grow light 10 may be tuned or configured by varying a ratio of the quantity of cool white LEDs 15 to the quantity of warm white LEDs 20, by varying a spatial arrangement among cool white LEDs 15 and warm white LEDs 20, and/or by varying a level of current provided to some or all of cool white LEDs 15, warm white LEDs 20, and supplemental radiation emitters 87.

Tuning or configuring the intensity and/or spectral composition of the radiant energy emitted by grow light 10 may include tuning or configuring one or more drivers (e.g., driver 25 as illustrated in FIG. 1). In one or more embodiments, driver 25 may be configured to provide to an equal current level to each of cool white LEDs 15 and each of warm white LEDs 20. In one or more embodiments, driver 25 may alternatively be configured to provide a first current level to each of the cool white LEDs 15 and a second, different current level to each of the warm white LEDs 20. In one or more embodiments, a third current level may be provided to each of supplemental radiation emitters 87. In one or more embodiments, driver 25 may be configured to provide to each of cool white LEDs 15 and/or each of warm white LEDs 20 a current level of from 0.1 milliamps (mA) to 1000 mA. The ranges described in this application are not intended to be limited to the precise range referenced, but rather are intended to also incorporate margins of error and other variations to be expected and understood by those of ordinary skill in the art. In one or more embodiments, driver 25 may be configured to provide to each of cool white LEDs 15 and/or each of warm white LEDs 20 a current level of from 1 mA to 100 mA. In one or more embodiments, driver 25 may be configured to provide to each of the cool white LEDs 15 and/or each of the warm white LEDs 20 a current level of from 50 mA to 100 mA. In one or more embodiments, driver 25 may be configured to provide to each of the cool white LEDs 15 and/or each of the warm white LEDs 20 a current level of from 70 mA to 90 mA (e.g., 80 mA or 90 mA). In one or more embodiments, driver 90 illustrated in FIG. 6, may be configured to provide to each of supplemental radiation emitters 87 a current level of from 0.1 mA to 1000 mA. In one or more embodiments, for example, driver 90 may be configured to deliver a current level of from 1 mA to 300 mA, from 50 mA to 250 mA, or from 100 mA to 200 mA.

In one or more embodiments in which control modules 95, 100, and/or 105 are configured or programmed to automatically retune or reconfigure the intensity and/or spectral composition of the radiant energy emitted from one or more light engines 60 and/or supplemental radiation engines 80 based on calendar scheduling, circadian cycles, sunrise/sunset times, and/or other considerations dictated by plant species, growth cycle, season, and other factors affecting plant growth, drivers 30 may be configured to provide cool white LEDs 15 a current level of from 0.1 mA to 20 mA during a first predetermined time frame (e.g., a sunrise timeframe at which the intensity and/or spectral composition of the radiant energy emitted by grow light 10 is designed to emulate one or more qualities of natural sunlight occurring at sunrise). In one or more embodiments, drivers 30 may be configured to provide cool white LEDs 15 a current level of from 0.1 mA to 10 mA, from 5 mA to 15 mA, or from 5 mA to 10 mA during the first predetermined time frame. The level of current provided to cool white LEDs 15 may be manually or automatically varied as a function of time as the first predetermined time frame progresses and/or transitions to additional timeframes (e.g., a second predetermine timeframe).

Driver 35 may be configured to provide warm white LEDs 20 a current level of from 0.1 mA to 20 mA, from 0.1 mA to 10 mA, from 5 mA to 15 mA, or from 5 mA to 10 mA during the first predetermined time frame. The level of current provided to cool white LEDs 15 may be automatically varied as a function of time as the first predetermined time frame progresses and/or transitions to additional timeframes (e.g., a second predetermine timeframe).

Driver 90 may be configured to provide supplemental radiation emitters 87 a current level of from 1 mA to 35 mA, from 5 mA to 30 mA, from 10 mA to 25 mA, or from 15 mA to 20 mA during the first predetermined time frame. The level of current provided to supplemental radiation emitters 87 may be automatically varied as a function of time as the first predetermined time frame progresses and/or transitions to additional timeframes (e.g., a second predetermine timeframe).

Driver 30 may be configured to provide cool white LEDs 20 a current level of from 0.1 mA to 1000 mA, from 1 mA to 100 mA, from 50 mA to 100 mA, or from 70 mA to 90 mA (e.g., 80 mA or 90 mA) during a second predetermined time frame (e.g., a noon-day timeframe at which the intensity and/or spectral composition of the radiant energy emitted by grow light 10 is designed to at least emulate one or more qualities of natural sunlight occurring at noon).

Driver 35 may be configured to provide warm white LEDs 20 a current level of from 0.1 mA to 1000 mA, from 1 mA to 100 mA, from 50 mA to 100 mA, or from 70 mA to 90 mA (e.g., 80 mA or 90 mA) during the second predetermined time frame.

Driver 90 may be configured to provide supplemental radiation emitters 87 a current level of from 1 mA to 150 mA, from 25 mA to 125 mA, from 50 mA to 100 mA, or from 80 mA to 100 mA during the second predetermined time frame.

In one or more embodiments, drivers 30 and 35 may be independently configured such that the level of current provided by driver 30 may be manually or automatically varied at a different level or rate than that of driver 35. In one or more embodiments, drivers 30 and 35 may be synchronized or otherwise configured to vary their respective current levels at the same time and/or rate.

In one or more embodiments, driver 90 may be independently configured such that the level of current provided by driver 90 may be manually or automatically varied at a different level or rate than that of driver 30 and/or driver 35. In one or more embodiments, drivers 30, 35, and 90 may be synchronized or otherwise configured to vary their respective current levels at the same time and/or rate.

As illustrated in FIG. 7, in one or more embodiments, an overall spectral composition of the radiant energy collectively emitted by cool white LEDs 15 and warm white LEDs 20 of grow light 10 has a first-highest peak wavelength 120 of from 430 nm to 470 nm to promote root growth and photosynthesis. For purposes of this application, the term "peak wavelength" standing alone and the term "first-highest peak wavelength" each mean the wavelength at which the radiant power (i.e., the radiance or the radiant intensity) of a source of electromagnetic radiation is at a maximum relative to the source's radiant power at all other wavelengths. In one or more embodiments, first-highest peak wavelength 120 may be from 400 nm to 510 nm, from 430 nm to 510 nm, from 430 nm to 495 nm, from 430 nm to 460 nm, from 440 nm to 490 nm, from 445 nm to 455 nm, or from 449 nm to 451 nm (e.g., 450 nm).

In one or more embodiments, the overall spectral composition of the radiant energy collectively emitted by cool white LEDs 15 and warm white LEDs 20 of grow light 10 has, with respect to the first-highest peak 120, a second-highest peak wavelength 125 of from 560 nm to 640 nm to stimulate stem growth, flowering, and chlorophyll production. For purposes of this application, the term "second-highest peak wavelength" means the wavelength at which the source's radiant power is lower than at the first-highest peak wavelength but greater than at all wavelengths other than the first-highest peak wavelength. In one or more embodiments, second-highest peak wavelength 125 may be from 560 nm to 780 nm, from 580 nm to 620 nm, from 590 nm to 610 nm, or from 595 nm to 605 nm (e.g., 595).

In one or more embodiments, the spectral composition of the radiant energy contributed by cool white LEDs 15 to the overall spectral composition illustrated in FIG. 7 has a first-highest peak wavelength of from 400 nm to 510 nm, from 400 nm to 510 nm, from 430 nm to 495 nm, from 430 nm to 470 nm, from 440 nm to 460 nm, from 445 nm to 455 nm, or from 449 nm to 451 nm (e.g., 450 nm). In one or more embodiments, the spectral composition of the radiant energy contributed by cool white LEDs 15 to the overall spectral composition illustrated in FIG. 7 has, with respect to the first-highest peak, a second-highest peak wavelength of from 560 nm to 640 nm, from 580 nm to 620 nm, from 590 nm to 610 nm, or from 595 nm to 605 nm (e.g., 595 nm).

In one or more embodiments, the spectral composition of the radiant energy contributed to the overall spectral composition illustrated in FIG. 7 by warm white LEDs 20 has a first-highest peak wavelength of from 600 nm to 660 nm, from 620 nm to 640 nm, or from 625 nm to 635 nm. In one or more embodiments, the spectral composition of the radiant energy contributed by warm white LEDs 20 to the collective spectral composition illustrated in FIG. 7 has, with respect to the first-highest peak, a second-highest peak wavelength of from 400 nm to 510 nm, from 430 nm to 495 nm, from 420 nm to 460 nm, from 430 nm to 450 nm, or from 435 nm to 445 nm.

As illustrated in FIG. 7, in one or more embodiments, the overall spectral composition of the radiant energy collectively emitted by cool white LEDs 15 and warm white LEDs 20 includes wavelengths ranging from at least 400 nm to 800 nm, which not only encompasses the photosynthetically active radiation or "PAR" range of most plants (i.e., 440 nm to 700 nm), but also includes radiant energy at other wavelengths that promote plant growth. Unlike previously existing grow lights, in one or more embodiments the spectral composition of grow light 10 includes radiant energy at wavelengths located between the blue wavelength spectrum (e.g., 455 nm to 492 nm) and the red wavelength spectrum (620 nm to 780 nm). As illustrated in FIG. 7, for example, the spectral composition of the radiant energy emitted by grow light 10 not only includes peaks in or near the blue and red spectrums (e.g., peaks 120 and 125, respectively), but it also includes wavelengths 130 between the blue and red wavelength spectrums at relative spectral powers that are high enough to be of photosynthetic benefit to plants or other target organisms (e.g., at or above a predetermined threshold level of relative spectral power, such as 0.2 or greater, 0.3 or greater, or 0.4 or greater, depending on the wavelength).

FIG. 8 is a graph 135 illustrating a tuned or configured spectral composition of an exemplary grow light having one or more light engines 60 and a supplemental radiation engine 80 tuned or configured to supplement or boost the spectral composition of grow light 10 in the red spectrum (i.e., 620 nm to 780 nm). As discussed with respect to FIGS. 5 and 6, grow light 10 may include a supplemental radiation emitters 87 electrically coupled to one or more drivers (e.g., driver 90 as illustrated in FIG. 6). In one or more embodiments, supplemental radiation emitters 87 may be configured to emit visible light. In one or more embodiments, as illustrated in FIG. 8 for example, the supplemental radiation emitters may be configured to emit visible light having a spectral composition that includes wavelengths ranging from 620 to 780 nm (i.e., in what those of ordinary skill in the art should recognize as the red spectrum), from 630 to 750 nm, or from 640 to 680 nm. As a result, the overall spectral composition of the collective radiant energy emitted by grow light 10 not only includes a first-highest peak wavelength 140 in the red spectrum (e.g., 620 to 780 nm), the spectral composition also includes a second-highest peak wavelength 145 in the blue spectrum (e.g., 455 nm to 492 nm), and a plurality of wavelengths 150 between first-highest peak wavelength 140 and second-highest peak wavelength 145 at relative spectral powers that are high enough to be of photosynthetic benefit to plants or other target organisms (e.g., at or above a predetermined threshold of relative spectral power, such as 0.2 or greater, 0.3 or greater, or 0.4 or greater, depending on the wavelength).

Although FIG. 8 illustrates an exemplary effect of supplemental radiation emitters 87 tuned or configured to boost the spectral composition of grow light 10 in the red spectrum, those of ordinary skill in the art should recognize and appreciate that supplemental radiation emitters 87 may be tuned or configured to compliment, supplemental, boost, or otherwise influence the spectral composition of grow light 10 at other wavelengths. In one more embodiments, for example, the spectral composition of the radiant energy emitted by supplemental radiation emitters 87 (and thus contributed by supplemental radiation emitters 87 to the overall spectral composition of the collective radiant energy emitted by grow light 10) may include, for example, wavelengths ranging from 455 nm to 492 nm (i.e., in what those of ordinary skill in the art should recognize as the blue spectrum), from 465 to 480 nm, or from 470 to 475 nm. In one or more embodiments, the spectral composition of the radiant energy emitted by supplemental radiation emitters 87 may include wavelengths in the green wavelength spectrum to provide photosynthetic benefits to certain species of red algae. In one or more embodiments, the supplemental radiation emitters may be configured to contribute ultraviolet and/or infrared radiation to the collective radiant energy emitted by grow light 10.

FIG. 9 is a graph 155 illustrating a tuned or configured spectral composition of an exemplary grow light having one or more light engines 60 and a supplemental radiation engine 80 tuned or configured to supplement or boost the spectral composition of grow light 10 in the ultraviolet spectrum. The spectral composition of the emitted ultraviolet radiation may include, for example, wavelengths ranging from 10 nm to 420 nm, from 300 nm to 420 nm, or from 350 nm to 420 nm. The spectral composition of the emitted ultraviolet radiation may include a first-highest peak wavelength of from 375 nm to 395 nm (e.g., 385 nm), from 385 nm to 405 nm (e.g., 395 nm), from 410 nm to 430 nm (e.g., 420 nm), or other wavelengths. In one or more embodiments, as illustrated in FIG. 9 for example, the ultraviolet radiation contributed by the supplemental radiation emitters 87 to the overall spectral composition of the collective radiant energy emitted by grow light 10 may result in a third-highest peak wavelength 175 with respect to a first-highest peak wavelength 165 and a second-highest peak wavelength 170. For purposes of this application, the term "third-highest peak wavelength" means the wavelength at which the source's radiant power is lower than at the first-highest peak wavelength and the second-highest peak wavelength, but greater than at all wavelengths other than the first-highest peak wavelength and the second-highest peak wavelength. As illustrated in FIG. 9, third-highest peak wavelength 175 may be at a wavelength of from 385 nm to 390 nm. In one or more embodiments, third-highest peak wavelength 175 may be at a wavelength of from 300 to 400 nm, from 375 nm to 395 nm, from 385 nm to 405 nm, from 410 nm to 430 nm, or other ranges within the ultraviolet wavelength spectrum. The overall spectral composition of the collective radiant energy emitted by grow light 10 may further include a plurality of wavelengths 180 between first-highest peak wavelength 165 and second-highest peak wavelength 170 at relative spectral powers that are high enough to be of photosynthetic benefit to plants or other target organisms (e.g., at or above a predetermined threshold of relative spectral powers, such as 0.2 or greater, 0.3 or greater, or 0.4 or greater, depending on the wavelength). In one or more embodiments, supplemental light emitters 87 may be configured to emit infrared radiation with a spectral composition that includes wavelengths ranging from 700 nm to 1 mm.

As those of ordinary skill in the art will readily appreciate based on the foregoing description and accompanying illustrations, in one or more embodiments a method of manufacturing a grow light includes electrically coupling a plurality of cool white LEDs (e.g., cool white LEDs 15 illustrated in FIGS. 1-3) and a plurality of warm white LEDs (e.g., warm white LEDs 20 illustrated in FIGS. 1-3) to a circuit board (e.g., circuit board 65 illustrated in FIG. 3). The method may include selecting an initial color temperature of each of the cool white LEDs and/or each of the warm white LEDs by using an integrating sphere.

The method further includes electrically coupling the cool white LEDs and the warm white LEDs to one or more drivers (e.g., either to a single or multi-channel driver, such as driver 25 illustrated in FIG. 1, or to independent drivers, such as drivers 30 and 35 illustrated in FIG. 2). In one or more embodiments, the method may include electrically coupling the one or more drivers to a control module (e.g., control module 95 illustrated in FIG. 6), which may be an autonomous control module, a wireless control module, or other type of control module recognized as suitable by those of ordinary skill in the art. The method may further include electrically coupling one or more user control interfaces to the one or more drivers to permit a user (e.g., a manufacturer or horticulturalist end-user) to repeatedly retune or reconfigure a level of current provided from the one or more drivers to the cool white LEDs and/or warm white LEDs.

In one or more embodiments, the method may include electrically coupling one or more supplemental radiation emitters to the circuit board or to an independent, second circuit board of the grow light. The method may include electrically coupling the supplemental radiation emitters to the one or more drivers (either to the same one or more drivers as the cool white LEDs and/or warm white LEDs or to an independent driver) and the one or more user control interfaces to permit the user (e.g., a manufacturer or horticulturalist end-user) to repeatedly retune or reconfigure a level of current provided from the one or more drivers to the supplemental radiation emitters.

The method may include automatically retuning or reconfiguring the level of current based on a predetermined trigger, event, time schedule (e.g., a continuously updated sunrise/sunset calendar), or other parameter. The automatic retuning or configuring may occur through the receipt of control signals provided by a computerized control system (e.g., a server-based or cloud-based application that includes, for instance, a mobile application).

The method may include arranging the cool white LEDs, the warm white LEDs, and/or the supplemental radiation emitters such that a spacing among some or all of the cool white LEDs, the warm white LEDs and/or the supplemental radiation emitters is uniform. The method may include arranging the cool white LEDs and the warm white LEDs in an alternating manner (e.g., in alternating strips, rows, or columns of LEDs, or such that the LEDs alternate on the level of individual LEDs).

The method may include confirming that an overall intensity and/or spectral composition of the radiant energy emitted by the grow light includes a predetermined or target first-highest peak wavelength, a predetermined or target second-highest peak wavelength, a predetermined or target third-highest peak wavelength, or additional predetermined or target peak wavelengths (e.g., by using a PAR meter or spectrometer, which in one or more embodiments may be integrated within the grow light).

The predetermined or target first-highest peak wavelength and second-highest peak wavelength may each be a wavelength of from 455 nm to 492 nm (i.e., in the blue spectrum) or from 620 nm to 780 nm (i.e., in the red spectrum) to promote root growth, stem growth, flowering, and/or chlorophyll production, among other possible reasons. The predetermined or target third-highest peak wavelength may be a wavelength of from 300 nm to 400 nm (i.e., within the ultraviolet radiation spectrum) or from 700 nm to 1 mm (i.e., within the infrared radiation spectrum) to further promote photosynthesis and/or to promote certain compounds that increase crop yield, among other possible reasons. The method may include confirming that the spectral composition includes a plurality of wavelengths between the first-highest peak wavelength and the second-highest peak wavelength at a relative spectral power that meets or exceeds a predetermined threshold relative spectral power (e.g., at least 0.1, at least 0.2, at least 0.3, or at least 0.4 relative spectral power).

The foregoing description is presented for purposes of illustration. It is not intended to be exhaustive or to limit the subject matter to the precise forms disclosed. Those of ordinary skill in the art will readily recognize and appreciate that modifications and variations are possible in light of, and contemplated by, the present teachings. The described embodiments were chosen in order to best explain the principles of the subject matter, its practical application, and to enable others skilled in the art to make use of the same in various embodiments and with various modifications as best suited for the particular application being contemplated.

What is claimed is:

1. A horticulture grow light comprising:
   a first plurality of white LEDs having a color temperature greater than or equal to 4000 Kelvin (K) and configured to emit a first radiant energy;
   a second plurality of white LEDs having a color temperature less than or equal to 3500 K and configured to emit a second radiant energy; and
   a driver configured to drive the first plurality of white LEDs and the second plurality of white LEDs,
   wherein, in a first mode, the driver provides a first current level to the first plurality of white LEDs and a second current level to the second plurality of white LEDs such that the first and second radiant energy combine to have a first spectral composition having a first highest peak wavelength in a range from 400 nm to 510 nm and a second highest peak wavelength in a range from 560 nm to 780 nm, and wherein, in a second mode, the driver provides a third current level to the first plurality of white LEDs and a fourth current level to the second plurality of white LEDs such that the first and second radiant energy combine to have a second spectral composition having a first highest peak wavelength in a range from 560 nm to 780 nm and a second highest peak wavelength in a range from 400 nm to 510 nm.

2. The horticulture grow light of claim 1, wherein the quantity of the first plurality of white LEDs is greater than the quantity of the second plurality of white LEDs.

3. The horticulture grow light of claim 1, wherein first plurality of white LEDs and the second plurality of white LEDs are configured in a plurality of alternating strips of the first plurality of white LEDs and the second plurality of white LEDs.

4. The horticulture grow light of claim 1, wherein at least a portion of the first plurality of white LEDs and at least a portion of the second plurality of white LEDs are configured such that each of the first plurality of white LEDs is adjacent to at least two of the second plurality of white LEDs.

5. The horticulture grow light of claim 1,
wherein the driver is a DC driver, and
wherein the DC driver is configured to provide to each of the first plurality of white LEDs and each of the second plurality of white LEDs a current level of greater than 30 mA.

6. The horticulture grow light of claim 1, wherein, in the first mode, the first highest peak wavelength is in a range from 430 nm to 470 nm.

7. The horticulture grow light of claim 6, wherein, in the first mode, the second highest peak wavelength is in a range from 560 nm to 640 nm.

8. The horticulture grow light of claim 1, wherein the first and second spectral compositions further comprise non-peak wavelengths ranging from 300 nm to 1000 nm.

9. The horticulture grow light of claim 1, wherein at least one wavelength between the first highest peak wavelength and the second highest peak wavelength has a relative spectral power greater than the relative spectral power of at least one of the first highest peak wavelength and the second highest peak wavelength.

10. The horticulture grow light of claim 1, wherein the first and second spectral compositions further comprise a third highest peak wavelength in a range from 300 nm to 400 nm.

11. The horticulture grow light of claim 1, further comprising a control module configured to automatically reconfigure the spectral composition based on a photoautotroph growth cycle.

12. The horticulture grow light of claim 1, further comprising a plurality of supplemental radiation emitters,
wherein the supplemental radiation emitters are configured to emit at least one of visible light, ultraviolet radiation having wavelengths ranging from 300 nm to 400 nm, or infrared radiation having wavelengths ranging from 700 nm to 1 mm.

13. The horticulture grow light of claim 1, wherein the first plurality of white LEDs and the second plurality of white LEDs are directly mounted on a substrate.

14. The horticulture grow light of claim 1, wherein the first plurality of white LEDs are directly mounted on a first substrate, and the second plurality of white LEDs are directly mounted on a second substrate.

15. A horticulture grow light comprising a plurality of light engines, each light engine comprising:
a first plurality of white LEDs coupled to a circuit board, the first plurality of white LEDs having a color temperature greater than or equal to 4000 Kelvin (K) and being configured to emit a first radiant energy;
a second plurality of white LEDs coupled to the circuit board, the second plurality of white LEDs having a color temperature less than or equal to 3500 K and being configured to emit a second radiant energy; and
a driver configured to separately drive the first plurality of white LEDs and the second plurality of white LEDs,
wherein, in a first mode, the driver outputs a first current level to the first plurality of white LEDs and a second current level to the second plurality of white LEDs such that the first and second radiant energy combine to have a first spectral composition having a first-highest peak wavelength in a range from 560 nm to 780 nm and, with respect to the first-highest peak wavelength, a second-highest peak wavelength in a range from 400 nm to 510 nm, and
wherein, in a second mode, the driver outputs a third current level to the first plurality of white LEDs and a fourth current level to the second plurality of white LEDs such that the first and second radiant energy combine to have a second spectral composition having a first-highest peak wavelength in a range from 400 nm to 510 nm and a second-highest peak wavelength in a range from 560 nm to 780 nm.

16. A horticulture grow light comprising:
a first plurality white LEDs having a color temperature greater than or equal to 4000 Kelvin (K) and configured to emit a first radiant energy;
a second plurality white LEDs having a color temperature less than or equal to 3500 K and configured to emit a second radiant energy; and
a driver configured to drive the first plurality of white LEDs and the second plurality of white LEDs,
wherein, in a first mode, the first and second radiant energy combine to have a first spectral composition having:
a first highest peak wavelength in a range from 400 nm to 510 nm; and
a second highest peak wavelength in a range from 560 nm to 780 nm;
wherein, in a second mode, a first current provided to the first plurality of white LEDs and a second current provided the second plurality of white LEDs by the driver are modified such that the first and second radiant energy combine to have a second spectral composition having:
a first highest peak wavelength in a range from 560 nm to 780 nm; and
a second highest peak wavelength in a range from 400 nm to 510 nm.

17. The horticulture grow light of claim 16, wherein the first plurality of white LEDs and the second plurality of white LEDs are directly mounted to a substrate.

* * * * *

UNITED STATES PATENT AND TRADEMARK OFFICE
CERTIFICATE OF CORRECTION

PATENT NO. : 10,785,921 B2  
APPLICATION NO. : 16/230943  
DATED : September 29, 2020  
INVENTOR(S) : Anthony Vilgiate Page 1 of 1

It is certified that error appears in the above-identified patent and that said Letters Patent is hereby corrected as shown below:

In the Claims

Column 18, Claim 16, Line 34      After "first plurality" insert -- of --

Column 18, Claim 16, Line 37      After "second plurality" insert -- of --

Column 18, Claim 16, Line 51      After "current provided" insert -- to --

Signed and Sealed this  
Second Day of November, 2021

Drew Hirshfeld  
*Performing the Functions and Duties of the*  
*Under Secretary of Commerce for Intellectual Property and*  
*Director of the United States Patent and Trademark Office*